US012658452B2

(12) United States Patent (10) Patent No.: US 12,658,452 B2
Matsuhara et al. (45) Date of Patent: Jun. 16, 2026

(54) NEGATIVE ELECTRODE

(71) Applicant: TOYOTA JIDOSHA KABUSHIKI KAISHA, Toyota (JP)

(72) Inventors: Shinsuke Matsuhara, Miyoshi (JP); Tatsuya Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 629 days.

(21) Appl. No.: 18/100,378

(22) Filed: Jan. 23, 2023

(65) Prior Publication Data

US 2023/0290960 A1 Sep. 14, 2023

(30) Foreign Application Priority Data

Mar. 14, 2022 (JP) ................................. 2022-038807

(51) Int. Cl.
  H01M 4/66 (2006.01)
  H01M 4/02 (2006.01)
  H01M 4/62 (2006.01)
(52) U.S. Cl.
  CPC ........... H01M 4/667 (2013.01); H01M 4/621 (2013.01); H01M 2004/027 (2013.01)
(58) Field of Classification Search
  None
  See application file for complete search history.

(56) References Cited

U.S. PATENT DOCUMENTS

2006/0062717 A1 3/2006 Tokuoka et al.
2007/0190423 A1 * 8/2007 Ishii ...................... H01M 4/587
  429/223

2011/0136015 A1 6/2011 Sugaya et al.
2012/0148922 A1 6/2012 Takahashi
2016/0233513 A1 8/2016 Abe et al.

FOREIGN PATENT DOCUMENTS

| CN | 1906780 A | 1/2007 |
| CN | 105580173 A | 5/2016 |
| JP | 10-321219 A | 12/1998 |
| JP | 2006-083030 A | 3/2006 |
| JP | 2013-089574 A | 5/2013 |
| WO | 2010/146832 A1 | 12/2010 |
| WO | 2012/001845 A1 | 1/2012 |
| WO | WO-2015046304 A1 * | 4/2015 ............ H01M 4/622 |

OTHER PUBLICATIONS

Abe et al., WO 2015046304 A1, English Translation from FIT (Year: 2015).*

* cited by examiner

*Primary Examiner* — Colin W. Slifka
(74) *Attorney, Agent, or Firm* — Sughrue Mion, PLLC

(57) ABSTRACT

A negative electrode for a lithium-ion secondary battery, wherein the negative electrode includes a negative electrode current collector and a negative electrode layer, and the negative electrode layer includes a negative electrode active material and a binder, wherein an elastic modulus of the binder is larger than a 811 MPa, and an X-ray diffraction intensity of a (110) plane of the negative electrode active material is I (110), and an X-ray diffraction intensity of a (004) plane is I (004). The negative electrode is characterized in that an orientation degree I (110)/I (004) of the negative electrode active material obtained by dividing I (110) by I (004) is larger than 0.23.

6 Claims, 1 Drawing Sheet

NEGATIVE ELECTRODE

CROSS-REFERENCE TO RELATED APPLICATION

This application claims priority to Japanese Patent Application No. 2022-038807 filed on Mar. 14, 2022, incorporated herein by reference in its entirety.

BACKGROUND

1. Technical Field

The present disclosure relates to a negative electrode.

2. Description of Related Art

In recent years, with the rapid spread of information-related devices and communication devices such as personal computers, video cameras, and mobile phones, development of a battery used as a power source for the devices above has been considered important. Also, in the automobile industry and the like, development of a high-output and high-capacity battery for battery electric vehicles and hybrid electric vehicles is underway.

Japanese Unexamined Patent Application Publication No. 2013-089574 (JP 2013-089574 A) discloses a secondary battery that sufficiently exhibits the effect of excellent output performance in the case of disposing graphite in the vertical direction with a magnetic field applied, by defining the porosity of the positive electrode mixture and the negative electrode mixture, the aspect ratio of the negative electrode active material, the vertical degree, and the mixture density.

Japanese Unexamined Patent Application Publication No. 1998-321219 (JP 1998-321219 A) discloses a method for manufacturing a negative electrode for a battery, which is characterized in that a cured layer of a graphite-based negative electrode active material composition is formed on a negative electrode current collector under a magnetic field.

Japanese Unexamined Patent Application Publication No. 2006-083030 (JP 2006-083030 A) discloses a graphite powder characterized in that natural graphite particles are processed into spheres by impact and/or rubbing.

SUMMARY

Further reduction in a battery resistance is required.

The present disclosure has been made in view of the above circumstances, and a main object thereof is to provide a negative electrode capable of reducing the battery resistance.

A negative electrode of the present disclosure is a negative electrode for a lithium-ion secondary battery. The negative electrode includes a negative electrode current collector and a negative electrode layer. The negative electrode layer includes a negative electrode active material and a binder. The binder has an elastic modulus greater than 811 MPa. When an X-ray diffraction intensity of a (110) plane of the negative electrode active material is I (110) and the X-ray diffraction intensity of a (004) plane is I (004), an orientation degree I (110)/I (004) of the negative electrode active material obtained by dividing I (110) by I (004) is greater than 0.23.

In the negative electrode of the present disclosure, an aspect ratio of the negative electrode active material may be greater than 1.2.

In the negative electrode of the present disclosure, the negative electrode active material may be a scaly graphite.

In the negative electrode of the present disclosure, the elastic modulus of the binder may be 3000 MPa or less.

In the negative electrode of the present disclosure, the elastic modulus of the binder may be 1886 MPa or less.

In the negative electrode of the present disclosure, the elastic modulus of the binder may be 1027 MPa or more.

In the negative electrode of the present disclosure, the orientation degree I (110)/I (004) may be 0.25 or more.

The present disclosure can provide a negative electrode capable of reducing a battery resistance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
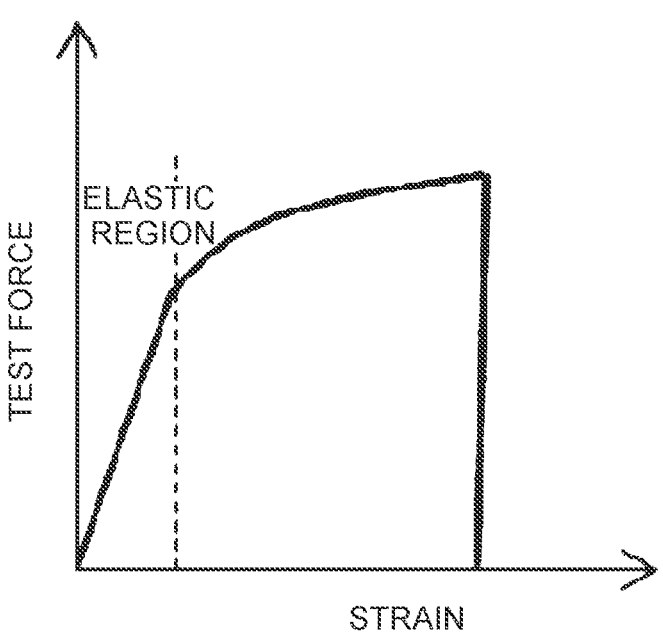
FIG. 1 is a graph illustrating an example of a relationship between strain and test force.

Hereinafter, embodiments according to the present disclosure will be described. Note that matters other than those specifically mentioned in the present specification and necessary for the implementation of the present disclosure (for example, a general configuration of a negative electrode that does not characterize the present disclosure and a manufacturing process) can be understood as design matters of a person skilled in the art based on the prior art in the field. The present disclosure can be carried out based on content disclosed in the present specification and common knowledge in the technical field. In the present specification, the term "to" indicating a numerical range is used to include the numerical values before and after the term as lower and upper limit values. Any combination of the upper limit value and the lower limit value in the numerical range can be adopted.

The negative electrode of the present disclosure is a negative electrode for a lithium-ion secondary battery. The negative electrode includes a negative electrode current collector and a negative electrode layer. The negative electrode layer includes a negative electrode active material and a binder. The elastic modulus of the binder is greater than 811 MPa. When the X-ray diffraction intensity of the (110) plane of the negative electrode active material is I (110) and the X-ray diffraction intensity of the (004) plane is I (004), the orientation degree I (110)/I (004) of the negative electrode active material obtained by dividing I (110) by I (004) is greater than 0.23.

Depending on the type of the binder used in the negative electrode layer, the binder may not be sufficiently effective. This is because the vertical degree of the negative electrode active material at the time of pressing the negative electrode layer varies depending on the softness of the binder used for the negative electrode layer. In the negative electrode of the present disclosure, a binder (hard binder) having a high elastic modulus is used. According to the negative electrode of the present disclosure, when a negative electrode layer in which a magnetic field is applied and a negative electrode active material is arranged in a vertical direction is pressed, since the binder is hard, deformation of the binder is suppressed, so that tilting of the negative electrode active material from the vertical direction can be reduced, orientation of the negative electrode active material is maintained, whereby resistance of the battery can be reduced, and input/output performance of the battery can be improved. Increasing the addition amount of a soft binder can suppress the falling of the negative electrode active material, but the resistance of the battery increases due to the increase in the addition amount. On the other hand, according to the negative electrode of the present disclosure, the addition amount of the binder can be reduced as compared with the case where a soft binder is used. According to the negative electrode of the present disclosure, the resistance of the battery can be reduced by multiplying the negative electrode active material having a high degree of orientation by the binder having a high elastic modulus, and the input/output performance of the battery is improved.

Negative Electrode

The negative electrode includes a negative electrode current collector and a negative electrode layer.

Negative Electrode Layer

The negative electrode layer includes at least a negative electrode active material and a binder, and optionally contains a solid electrolyte, a conductive material, a thickener, and the like.

Examples of the negative electrode active material include graphite, mesocarbon microbeads (MCMB), highly oriented pyrolytic graphite (HOPG), hard carbon, and soft carbon. The graphite may be spheronized graphite, scaly graphite (hereinafter sometimes referred to as scaly graphite), or the like, and may be scaly graphite from the viewpoint of resistance reduction. The shape of the negative electrode active material is not particularly limited, but may be particulate, scaly, plate-like, or the like.

The aspect ratio of the negative electrode active material may be greater than 1.2 or greater than or equal to 2.0. The aspect ratio of the negative electrode active material may be 10 or less. The aspect-ratio is expressed by a/b when the length of the negative electrode active material in the long axis direction is a and the length of the negative electrode active material in the short axis direction is b. For example, the aspect-ratio of the graphite is determined by determining the length A in the longitudinal direction and the length B in the minor axis direction of the graphite by observation using a transmission electron microscope (TEM) or a scanning electron microscope (SEM). When the graphite has a thickness direction such as a scaly shape, the thickness is defined as a length B in the short axis direction. As the aspect ratio of the negative electrode active material (e.g., graphite) increases, the anisotropy of the electron resistance of the negative electrode active material itself (i.e., there is a difference in the magnitude of the resistance depending on the direction of the orientation) tends to increase, so that the negative electrode active material (e.g., a negative electrode active material having an aspect ratio greater than 1.2) can be reduced in resistance by applying a magnetic field and orienting (typically oriented in a direction substantially perpendicular to the negative electrode current collector) as described later.

As the binder, any binder having an elastic modulus larger than that of 811 MPa may be used, and one or a combination of two or more materials used as a conventionally known binder may be used. Examples of the binder include cellulose-based polymers such as acrylic acid-based binders, polyimide-based binders, polyamide-based binders, carboxymethylcellulose (CMC), methylcellulose (MC), cellulose acetate phthalate (CAP), and hydroxypropylmethylcellulose (HPMC), fluorine-based resins such as polyvinyl alcohol (PVA), polytetrafluoroethylene (PTFE), vinyl acetate copolymers, and rubbers such as styrene-butadiene rubber (SBR). The materials exemplified above can be used for the purpose of exhibiting a function as a thickener in addition to a function as a binder. The elastic modulus of the binder may be greater than or equal to 1027 MPa, less than or equal to 3000 MPa, or less than or equal to 1886 MPa.

As the conductive material used for the negative electrode layer, the same conductive material as that exemplified in the positive electrode layer can be used. As the solid electrolyte to be used for the negative electrode layer, the same ones as those exemplified in the solid electrolyte layer can be exemplified.

The thickness of the negative electrode layer is not particularly limited, but may be, for example, 10 μm to 100 μm.

The content of the negative electrode active material in the negative electrode layer is not particularly limited, but may be, for example, 20% by mass to 99% by mass.

When the X-ray diffraction intensity of the (110) plane of the negative electrode active material is I (110) and the X-ray diffraction intensity of the (004) plane is I (004), the orientation degree I (110)/I (004) of the negative electrode active material obtained by dividing I (110) by I (004) may be greater than or equal to 0.23, may be greater than or equal to 0.25, and may be greater than or equal to 0.29. The upper limit of the degree of orientation is not particularly limited, but may be, for example, 0.80 or less.

The negative electrode layer is formed, for example, as follows. First, a negative electrode mixture containing the negative electrode active material (e.g., scaly graphite), a binder (e.g., SBR), a thickener (e.g., CMC), and the like, and further containing a solvent (e.g., water) is prepared (prepared, purchased, etc.), and the negative electrode mixture is applied to the surface of the negative electrode current collector as needed. The method of applying the negative electrode mixture to the negative electrode current collector is not particularly limited, and examples thereof include a doctor blade method, a metal mask printing method, an electrostatic coating method, a dip coating method, a spray coating method, a roll coating method, a gravure coating method, and a screen printing method.

Next, in order to make the degree of orientation of the negative electrode active material greater than 0.23, a magnetic field may be applied to the negative electrode mixture (which may be a negative electrode mixture in a state where a solvent remains and is not dried) applied to the surface of the negative electrode current collector. By using a magnetic field generator such as a permanent magnet or an electromagnetic coil, a magnetic field is applied such that the direction of the magnetic field lines is a direction orthogonal to the surface of the negative electrode current collector. The strength of the magnetic field applied to the negative electrode mixture applied to the surface of the negative electrode current collector may be, for example, 0.08 T to 1 T or 0.3 T to 0.6 T. The time for applying the magnetic field to the negative electrode mixture may be, for example, 1 second to 180 seconds. The negative electrode active material in the negative electrode mixture applied to the negative electrode current collector tends to be oriented such that the (004) plane of the negative electrode active material and the surface (wide plane) of the negative electrode current collector are approximately parallel (for example, the angle θn formed between the (004) plane of the negative electrode active material and the surface of the negative electrode current collector is oriented such that $0° \leq θn \leq 30°$). By applying the magnetic field to the negative electrode mixture as described above, the (004) plane of the negative electrode active material in the negative electrode mixture can be oriented so as to rise with respect to the negative electrode current collector (for example, the angle $\theta n$ formed between the (004) plane of the negative electrode active material and the surface of the negative electrode current collector can be oriented so that $60°\leq\theta n\leq90°$). In the case where the negative electrode active material is graphite, the "(004) plane of the negative electrode active material" is a layer plane (a plane horizontal to the graphite layer) of the graphite having a layered structure, and is a plane horizontal to the carbon network of the graphene sheet constituting the graphite.

Next, after the magnetic field is applied, the negative electrode mixture coated on the negative electrode current collector is dried to form a negative electrode layer. For example, the negative electrode mixture applied with the magnetic field passes through the drying furnace, whereby the negative electrode mixture applied to the negative electrode current collector can be dried. The drying temperature at this time may be, for example, 80° C. to 180° C. The drying time may be, for example, 10 seconds to 120 seconds. After the negative electrode layer is formed, the obtained negative electrode may be rolled (pressed) as necessary. As the rolling method, conventionally known rolling methods such as a flat plate press and a roll press can be employed. The pressing pressure may be, for example, equal to or higher than the linear pressure 1 kN/m and equal to or lower than 4 kN/m. When the pressing pressure is within the above range, the negative electrode active material oriented so as to rise with respect to the negative electrode current collector by applying a magnetic field to the negative electrode mixture at the time of forming the negative electrode layer maintains its orientation state. On the other hand, when the press pressure is too large, the influence of rolling is large, and therefore, the negative electrode active material oriented by applying a magnetic field falls asleep with respect to the negative electrode current collector (becomes substantially parallel), so that the diffusibility of lithium ions decreases and the resistance may increase. As described above, a negative electrode including the negative electrode current collector and the negative electrode layer formed on the surface of the negative electrode current collector is manufactured.

Negative Electrode Current Collector

The material of the negative electrode current collector may be a material that does not alloy with Li, and may be, for example, SUS, copper, and nickel. Examples of the shape of the negative electrode current collector include a foil shape and a plate shape. The shape of the negative electrode current collector in a plan view is not particularly limited. Examples thereof include a circular shape, an elliptical shape, a rectangular shape, and an arbitrary polygonal shape. Further, the thickness of the negative electrode current collector varies depending on the shape, and may be, for example, within the range of 1 μm to 50 μm, or within the range of 5 μm to 20 μm.

Battery

The negative electrode of the present disclosure is a negative electrode for a lithium-ion secondary battery. The lithium-ion secondary battery of the present disclosure may include a positive electrode, an electrolyte layer, and a negative electrode. The lithium-ion secondary battery may be an aqueous lithium-ion secondary battery, a nonaqueous lithium-ion secondary battery, an all-solid-state lithium-ion secondary battery, or the like. The shape of the lithium-ion secondary battery, for example, a coin type, a laminate type, a cylindrical, and a square type and the like. Applications of the lithium-ion secondary batteries are not particularly limited, and examples thereof include power supplies of vehicles such as hybrid electric vehicles (HEV), plug-in hybrid electric vehicles (PHEV), battery electric vehicles (BEV), gasoline-powered vehicles, and diesel-powered vehicles. In particular, the battery may be used as a drive power source for hybrid electric vehicles, plug-in hybrid electric vehicles, or battery electric vehicles. Also, the battery according to the present disclosure may be used as a power source for mobile bodies other than vehicles (for example, railroads, ships, and aircraft), and may be used as a power source for electric products such as an information processing device.

Positive Electrode

The positive electrode has a positive electrode layer and a positive electrode current collector when necessary.

Positive Electrode Layer

The positive electrode layer contains a positive electrode active material, and may contain a conductive material, a solid electrolyte, a binder, and the like as optional components.

There is no particular limitation on the type of the positive electrode active material, and any material that can be used as the active material of the all-solid-state battery can be employed. The positive electrode active material is, for example, a lithium alloy, $LiCoO_2$, $LiNi_xM_{1-x}O_2$ (x satisfies $0.5\leq x<1$, M is at least one element selected from the group consisting of Co, Mn and Al), and $LiMnO_2$, heterogeneous element-substituted Li—Mn spinel, lithium titanate, metal lithium phosphate, LiCoN, $Li_2SiO_3$, $Li_4SiO_4$, transition metal oxide, $TiS_2$, Si, $SiO_2$, Si alloy, and lithium storage intermetallic compound can be mentioned. The heterogeneous element-substituted Li—Mn spinel includes, for example, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. Lithium titanate includes, for example, $Li_4Ti_5O_{12}$. Lithium metal phosphate includes, for example, $LiFePO_4$, $LiMnPO_4$, $LiCoPO_4$, and $LiNiPO_4$. The transition-metal oxide is, for example, $V_2O_5$, and $MoO_3$. The lithium-storage intermetallic compound is, for example, $Mg_2Sn$, $Mg_2Ge$, $Mg_2Sb$, and $Cu_3Sb$. Examples of lithium alloy include Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te, and Li—At. Examples of Si alloy include alloys with metals such as Li, and may be an alloy with at least one metal selected from the group consisting of Sn, Ge, and Al. The shape of the positive electrode active material is not particularly limited, but may be particulate. When the positive electrode active material is particulate, the positive electrode active material may be primary particles or secondary particles. A Li ion-conductive oxide may be formed on the positive electrode active material. This is because the reaction between the positive electrode active material and the solid electrolyte can be suppressed. Examples of Li ion-conductive oxide include $LiNbO_3$, $Li_4Ti_5O_{12}$, and $Li_3PO_4$. The thickness of the coating layers is, for example, 0.1 nm or more, and may be 1 nm or more. On the other hand, the thickness of the coating layers may be, for example, less than or equal to 100 nm and less than or equal to 20 nm. The coating layer may cover, for example, 70% or more of the surface of the positive electrode active material, or may cover 90% or more.

As the conductive material, a known material can be used, and examples thereof include carbon materials and metal particles. Examples of carbon materials include at least one selected from the group consisting of acetylene black, furnace black, vapor grown carbon fiber (VGCF), a carbon nanotube, and a carbon nanofiber. Among the above, from the viewpoint of electron conductivity, at least one selected from the group consisting of VGCF, a carbon nanotube, and a carbon nanofiber may be used. Examples of metal particles include particles of Ni, Cu, Fe, and SUS. The content of the conductive material in the positive electrode layer is not particularly limited.

As the solid electrolyte, the same ones as those exemplified in the solid electrolyte layer can be exemplified. The content of the solid electrolyte in the positive electrode layer is not particularly limited, but may be in the range of, for example, 1% by mass to 80% by mass when the total mass of the positive electrode layer is 100% by mass.

As a binding agent (binder), polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, acrylonitrile-butadiene rubber (ABR), butadiene rubber (BR), polyvinylidene fluoride (PVdF), and styrene-butadiene rubber (SBR) can be exemplified. The content of the binder in the positive electrode layer is not particularly limited.

The thickness of the positive electrode layer is not particularly limited, but may be, for example, 10 μm to 100 μm.

The positive electrode layer can be formed by a conventionally known method. For example, a positive electrode layer forming paste is prepared by charging a positive electrode active material and, if necessary, other components into a solvent and stirring, and the positive electrode layer forming paste is coated on one surface of a support and dried to obtain a positive electrode layer. Examples of the solvent include, for example, butyl acetate, butyl butyrate, mesitylene, tetralin, heptane, and N-methyl-2-pyrrolidone (NMP). The method of applying the paste for forming the positive electrode layer on one surface of the support is not particularly limited, and examples thereof include the same methods as those exemplified as the method of applying the negative electrode mixture to the negative electrode current collector. As the support body, a support body with self-supporting properties can be appropriately selected and used, and there is no particular limitation. For example, metal foils such as Cu and Al can be used.

As another method of forming the positive electrode layer, the positive electrode layer may be formed by pressing a powder of a positive electrode mixture containing a positive electrode active material and other components as necessary. When the powder of the positive electrode mixture is pressure-molded, normally, a pressing pressure of 1 MPa or more and 2000 MPa or less as a surface pressure and 1 ton/cm or more and 100 ton/cm or less as a linear pressure are applied. The pressurizing method is not particularly limited, but examples thereof include a method for applying pressure using a flat plate press, a roll press, and the like.

Positive Electrode Current Collector

A known metal that can be used as a battery current collector can be used as the positive electrode current collector. As the metals above, a metal material containing one or more elements selected from the group consisting of Cu, Ni, Al, V, Au, Pt, Mg, Fe, Ti, Co, Cr, Zn, Ge, and In can be exemplified. Examples of positive electrode current collectors include SUS, aluminum, nickel, iron, titanium and carbon. The shape of the positive electrode current collector is not particularly limited, and various shapes such as a foil shape and a mesh shape can be used. The thickness of the positive electrode current collector varies depending on the shape, and may be, for example, within the range of 1 μm to 50 μm, or within the range of 5 μm to 20 μm.

Electrolyte Layer

The electrolyte layer contains at least an electrolyte. An aqueous electrolyte, a non-aqueous electrolyte, a gel electrolyte, a solid electrolyte, and the like can be used as the electrolyte. These may be used singly or in combination of two or more.

The solvent of the aqueous electrolytic solution contains water as a main component. That is, water may account for 50 mol % or more, particularly 70 mol % or more, and further 90 mol % or more with the total amount of the solvent (liquid component) constituting the electrolytic solution (100 mol %) as a reference. On the other hand, the upper limit of the proportion of water in the solvent is not particularly limited.

The solvent contains water as a main component, but may contain a solvent other than water. Examples of the solvent other than water include one or more selected from the group consisting of ethers, carbonates, nitriles, alcohols, ketones, amines, amides, sulfur compounds and hydrocarbons. The solvent other than water may be 50 mol % or less, particularly 30 mol % or less, and further 10 mol % or less with the total amount (100 mol %) of the solvent (liquid component) constituting the electrolytic solution as a reference.

Aqueous electrolytes used in the present disclosure include electrolytes. A conventionally known electrolyte can be used for the aqueous electrolyte. Examples of electrolytes include lithium salts, nitrates, acetates, and sulfates of imidic acid compounds. Specific examples of electrolytes include lithium bis(fluorosulfonyl)imide (LiFSI; CAS No. 171611-11-3), lithium bis(trifluoromethanesulfonyl)imide (LiTFSI; CAS No. 90076-65-6), lithium bis(penta Fluoroethanesulfonyl)imide (LiBETI; CAS No. 132843-44-8), lithium bis (nonafluorobutanesulfonyl)imide (CAS No. 119229-99-1), lithium nonafluoro-N-[(trifluoromethane)sulfonyl]butane sulfonylamide (CAS No. 176719-70-3), lithium N,N-hexafluoro-1,3-disulfonylimide (CAS No. 189217-62-7), $CH_3COOLi$, $LiPF_6$, $LiBF_4$, $Li_2SO_4$, and $LiNO_3$.

The concentration of the electrolyte in the aqueous electrolytic solution can be appropriately set within a range not exceeding the saturation concentration of the electrolyte with respect to the solvent, depending on the required battery characteristics. This is because when the solid electrolyte remains in the aqueous electrolyte, the solid may impede the battery reaction. For example, when LiTFSI is used as the electrolyte, the aqueous electrolyte may contain 1 mol or more, particularly 5 mol or more, and further 7.5 mol or more of LiTFSI per 1 kg of water. The upper limit is not particularly limited, and may be, for example, 25 mol or less.

As the non-aqueous electrolytic solution, normally, the non-aqueous electrolytic solution containing a lithium salt and a non-aqueous solvent is used. Examples of lithium salts include inorganic lithium salts such as $LiPF_6$, $LiBF_4$, $LiClO_4$ and $LiAsF_6$ and organic lithium salts such as $LiCF_3SO_3$, $Lin(SO_2CF_3)_2$(Li-TFSI), $LiN(SO_2C_2F_5)_2$, and $LiC(SO_2CF_3)_3$. Examples of non-aqueous solvents include ethylene carbonate (EC), propylene carbonate (PC), butylene carbonate (BC), dimethyl carbonate (DMC), diethyl carbonate (DEC), ethylmethyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and a mixture thereof. From the viewpoint of ensuring a high dielectric constant and a low viscosity, the non-aqueous solvent may be a mixture of a cyclic carbonate compound such as EC, PC, and BC having a high dielectric constant and a high viscosity and a cyclic carbonate compound such as DMC, DEC, and EMC having a low dielectric constant and a low viscosity, or may be a mixture of EC and DEC. The concentration of the lithium salt in the non-aqueous electrolyte may be, for example, 0.3 M to 5 M.

A gel electrolyte is generally obtained by adding a polymer to a non-aqueous electrolytic solution to form a gel. Specifically, the gel electrolyte is obtained by adding a polymer such as polyethylene oxide, polypropylene oxide, polyacrylonitrile, polyvinylidene fluoride (PVdF), polyurethane, polyacrylate, and cellulose to the non-aqueous electrolytic solution described above and forming a gel.

The electrolyte layer may be a separator that is impregnated with an electrolyte such as the aqueous electrolyte described above and that suppresses contact between the positive electrode layer and the negative electrode layer. The material of the separator is not particularly limited as long as the material is a porous film, and may be, for example, resins such as polyethylene (PE), polypropylene (PP), polyester, cellulose and polyamide, and in particular, may be polyethylene and polypropylene. Moreover, the separator may have a single-layer structure or a multilayer structure. Examples of the separator having a multi-layer structure include a separator having a two-layer structure of PE-PP and a separator having a three-layer structure of PP-PE-PP or PE-PP-PE. The separator may be a resin nonwoven fabric, a nonwoven fabric such as a glass fiber nonwoven fabric, and the like.

Solid Electrolyte Layer

The electrolyte layer may be a solid electrolyte layer composed of a solid. The solid electrolyte layer contains at least a solid electrolyte. As the solid electrolyte to be contained in the solid electrolyte layer, known solid electrolytes that can be used in all-solid-state batteries can be appropriately used, and examples thereof include sulfide-based solid electrolytes, oxide-based solid electrolytes, hydride-based solid electrolytes, and halide-based solid electrolytes, and inorganic solid electrolytes such as nitride-based solid electrolyte. The sulfide-based solid electrolyte may contain sulfur (S) as the main component of the anion element. The oxide-based solid electrolyte may contain oxygen (O) as a main component of the anion element. The hydride-based solid electrolyte may contain hydrogen (H) as the main component of the anion element. The halide-based solid electrolyte may contain halogen (X) as the main component of the anion element. The nitride-based solid electrolyte may contain nitrogen (N) as a main component of the anion element.

The sulfide-based solid electrolyte may be sulfide glass, crystallized sulfide glass (glass ceramics), or a crystalline material obtained by solid-phase reaction treatment of a raw material composition. The crystalline state of the sulfide-based solid electrolyte can be confirmed, for example, by subjecting the sulfide-based solid electrolyte to powder X-ray diffraction measurement using CuKα rays.

The sulfide glass can be obtained by subjecting a raw material composition (for example, a mixture of $Li_2S$ and $P_2S_5$) to amorphous processing. Examples of amorphous processing include mechanical milling.

The glass ceramics can be obtained, for example, by applying heat treatment to sulfide glass. The heat treatment temperature may be any temperature higher than the crystallization temperature (Tc) observed by thermal analysis measurement of sulfide glass, and is normally 195° C. or higher. On the other hand, the upper limit of the heat treatment temperature is not particularly limited. The crystallization temperature (Tc) of sulfide glass can be measured by differential thermal analysis (DTA). The heat treatment time is not particularly limited as long as the desired crystallinity of the glass-ceramics is obtained, but may be, for example, within a range of one minute to 24 hours, and in particular, may be within a range of one minute to 10 hours. The method for heat treatment is not particularly limited, but may be, for example, a method using a firing furnace.

Examples of the oxide-based solid electrolyte include a solid electrolyte containing an Li element, a Y element (Y is at least one of Nb, B, Al, Si, P, Ti, Zr, Mo, W, and S), and an O element. Specific examples of oxide-based solid electrolytes include garnet type solid electrolytes such as $Li_7La_3Zr_2O_{12}$, $Li_{7-x}La_3(Zr_{2-x}Nb_x)O_{12}$ (0≤x≤2), and $Li_5La_3Nb_2O_{12}$; perovskite type solid electrolytes such as (Li, La)$TiO_3$, (Li, La)$NbO_3$, and (Li, Sr)(Ta, Zr)$O_3$; nasicon type solid electrolytes such as Li(Al, Ti)(PO_4)_3 and Li(Al, Ga)(PO_4)_3; Li—P—O-based solid electrolytes such as $Li_3PO_4$, LIPON (a compound obtained by substituting a part of O of $Li_3PO_4$ with N); and Li—B—O-based solid electrolytes such as $Li_3BO_3$ and a compound obtained by substituting a part of O of $Li_3BO_3$ with C. In the present disclosure, the notation "(A, B, C)" in chemical formulas means "at least one selected from the group consisting of A, B, and C."

The hydride-based solid electrolyte contains, for example, Li and a complex anion containing hydrogen. Examples of the complex anion include $(BH_4)^-$, $(NH_2)^-$, $(AlH_4)^-$, and $(AlH_6)^{3-}$.

The halide-based solid electrolyte is represented, for example, by the following compositional formula (1).

$$Li_\alpha M_\beta X_\gamma \qquad \text{Formula (1)}$$

In the composition formula (1), $\alpha$, $\beta$, and $\gamma$ are each independently a value greater than 0. M contains at least one element selected from the group consisting of metal elements other than Li and metalloid elements. X contains at least one selected from the group consisting of F, Cl, Br, and I. In the present disclosure, "metalloid elements" are B, Si, Ge, As, Sb and Te. "Metallic element" means all elements contained in groups 1 to 12 of the periodic table except hydrogen, as well as all elements contained in groups 13 to 16 of the periodic table except B, Si, Ge, As, Sb, Te, C, N, P, O, S, and Se. That is, the term "metalloid element" or "metallic element" refers to a group of elements that can become cations when an inorganic compound is formed with a halogen element. More specifically, examples of the halide-based solid electrolyte include $Li_3YX_6$, $Li_2MgX_4$, $Li_2FeX_4$, $LiAlX_4$, $LiGaX_4$, $LiInX_4$, $Li_3AlX_6$, $Li_3GaX_6$, and $Li_3InX_6$. Here, X is at least one selected from the group consisting of F, Cl, Br, and I.

Examples of the nitride-based solid electrolytes include $Li_3N$.

The shape of the solid electrolyte may be particulate from the viewpoint of ease of handling. The average particle diameter of the particles of the solid electrolyte is not particularly limited, but is, for example, 10 nm or more, and may be 100 nm or more. On the other hand, the average particle diameter of the particles of the solid electrolyte is, for example, 25 μm or less, and may be 10 μm or less.

In the present disclosure, unless otherwise specified, the average particle diameter of particles is a volume-based median diameter (D50) measured by laser diffraction and scattering particle diameter distribution measurement. In the present disclosure, the median diameter (D50) is a diameter (volume average diameter) at which the cumulative volume of particles is half (50%) of the total volume when the particles are arranged in order from the smallest particle diameter.

The solid electrolyte can be used singly or in combination of two or more. Further, when two or more kinds of solid electrolytes are used, two or more kinds of solid electrolytes may be mixed, or two or more layers of each solid electrolyte may be formed to form a multilayer structure. The proportion of the solid electrolyte in the solid electrolyte layer is not particularly limited. The proportion is, for example, 50% by mass or more, and may be within the range of 60% by mass or more and 100% by mass or less, may be within the range of 70% by mass or more and 100% by mass or less, or may be 100% by mass.

The solid electrolyte layer may contain a binding agent from the viewpoint of developing plasticity. As such a binding agent, the materials exemplified as the binding agent used for the positive electrode layer can be exemplified. However, in order to facilitate high output, the binding agent contained in the solid electrolyte layer may be 5% by mass or less from the viewpoint of making it possible to form the solid electrolyte layer in which excessive aggregation of the solid electrolyte is suppressed and the solid electrolyte is uniformly dispersed.

The thickness of the solid electrolyte layer is not particularly limited, and is normally 0.1 μm or more and 1 mm or less. Examples of the method for forming the solid electrolyte layer include a method for applying the solid electrolyte layer forming paste containing a solid electrolyte onto a support body and drying the paste, and a method for pressure-molding a powder of a solid electrolyte material containing a solid electrolyte. Examples of the support body include those exemplified for the positive electrode layer. When the solid electrolyte material powder is pressure-molded, normally, a press pressure of about 1 MPa to 2000 MPa is applied. The pressurization method is not particularly limited. Examples of the pressurization method include the pressurization method exemplified in the formation of the positive electrode layer.

When necessary, a battery includes an exterior body, a restraining member, and the like for housing a laminated body including the positive electrode current collector, the positive electrode layer, the electrolyte layer, the negative electrode layer, and the negative electrode current collector in this order. The material of the exterior body is not particularly limited as long as the material is stable in the electrolyte. Examples thereof include polypropylene, polyethylene, and resins such as acrylic resins. The restraining member only needs to be able to apply a restraining pressure to the laminated body in a laminating direction, and any known restraining member that can be used as a restraining member for a battery can be used. Examples of the restraining member include a restraining member provided with plate shaped portions that interpose both surfaces of the laminated body therebetween, a rod shaped portion that connects the two plate shaped portions, and an adjusting portion that is connected to the rod shaped portion and adjusts the restraining pressure by a screw structure or the like. A desired restraining pressure can be applied to the laminated body by the adjusting portion. The restraining pressure is not particularly limited, but may be, for example, 0.1 MPa or more, 1 MPa or more, or 5 MPa or more. This is because an increase in the restraining pressure has an advantage of facilitating good contact between the layers. On the other hand, the restraining pressure is not particularly limited, but may be, for example, 100 MPa or less, 50 MPa or less, or 20 MPa or less. This is because when the restraining pressure is too large, the restraining member is required to have a high rigidity, which may increase the size of the restraining member. The battery may have only one laminated body, or may have a plurality of laminated bodies laminated on each other.

Method for Calculating Hardness (Elastic Modulus) of Binder

Binders dispersed in water were diluted with a coater and dried at room temperature to produce binder sheets of 200 μm to 300 μm thickness. The binder sheet was cut into strips of 10 mm×50 mm and subjected to a tensile test by autography. The tensile test was conducted as follows: Sheet sample width: 10 mm, Chuck-to-Chuck distance: 10 mm, and Tensile rate: 50 mm/min. FIG. 1 is a graph illustrating an example of a relationship between strain and test force. The elastic modulus (MPa) was calculated from the slope of the elastic regions shown in FIG. 1. The calculation results of the elastic modulus of the binder used for the negative electrode are shown in Table 1.

Comparative Example 1

Preparation of Positive Electrode $LiNi_{1/3}Mn_{1/3}Co_{1/3}O_2$ as a positive electrode active material, acetylene black (AB) as a conductive material, PVdF as a binder, the compositional ratio positive electrode active material:conductive material:binder=92.0:5.0:3.0 (solid content weight ratio) was weighed so as to be, to prepare a positive electrode mixture by mixing them. The prepared positive electrode mixture was coated on an aluminum foil as a positive electrode current collector, and dried at 100° C. to form a positive electrode layer on the positive electrode current collector. Thereafter, the positive electrode was pressed to a predetermined thickness by a roll press to obtain a positive electrode.

Preparation of Negative Electrode

Spheroidalized graphite (aspect ratio 1.2) as the negative electrode active material, carboxymethylcellulose (CMC) as a thickener, SBR (hardness 115 MPa) as a binder, the composition ratio negative electrode active material:thickener:binder=98.3/1.0/0.7 (solid content weight ratio) was weighed so as to be, to prepare a negative electrode mixture by mixing them. The prepared negative electrode mixture was coated on a Cu foil as a negative electrode current collector, and dried at 80° C. to form negative electrode layers on the negative electrode current collector. Thereafter, the material was pressed to a predetermined thickness by a roll press 4 kN/m a linear pressure to obtain a negative electrode. The aspect ratio of the negative electrode active material was calculated from the ratio of the major axis to the minor axis of the negative electrode active material (major axis/minor axis).

Preparation of Cells for Evaluation

A PP/PE/PP (thickness: 20 μm) was prepared as a separator, the prepared positive electrode was superposed on one surface of the separator so that the positive electrode layer was in contact with the separator, and the prepared negative electrode was superposed on the other surface so that the negative electrode layer was in contact with the separator, thereby obtaining a laminate. As an electrolyte, an electrolyte solution containing a mixed solvent of EC/DMC/EMC=3:4:3 vol % as a solvent was prepared as a LiPF61M, an electrolyte solution was injected into the laminate contained in the case, and the electrolyte solution was impregnated into the laminate to prepare a cell for evaluation.

Comparative Example 2

In the above Preparation of Negative Electrode, a cell for evaluation was prepared in the same manner as in Comparative Example 1, except that the prepared negative electrode mixture was coated on a Cu foil as a negative electrode current collector, held in a 0.3 T magnetic field for 3 minutes, and then dried at 80° C. to form a negative electrode layer on the negative electrode current collector.

Comparative Example 3

A cell for evaluating was prepared in the same manner as in Comparative Example 1 except that acrylate (hardness 1886 MPa) was used as a binder in the above Preparation of Negative Electrode.

Comparative Example 4

In the above Preparation of Negative Electrode, a cell for evaluation was prepared in the same manner as in Comparative Example 1, except that acrylic acid ester (hardness 1886 MPa) was used as a binder, the prepared negative electrode mixture was coated on a Cu foil as a negative electrode current collector, held in a 0.3 T magnetic field for 3 minutes, and then dried at 80° C. to form a negative electrode layer on the negative electrode current collector.

Comparative Example 5

In the above Preparation of Negative Electrode, a cell for evaluation was prepared in the same manner as in Comparative Example 1, except that scaly graphite (aspect ratio: 2.0) was used as the negative electrode active material.

Comparative Example 6

In the above Preparation of Negative Electrode, a cell for evaluation was prepared in the same manner as in Comparative Example 1, except that scaly graphite (aspect ratio: 2.0) was used as the negative electrode active material and acrylate (hardness 1886 MPa) was used as the binder.

Comparative Example 7

In the above Preparation of Negative Electrode, except that scaly graphite (aspect ratio: 2.0) was used as the negative electrode active material, the prepared negative electrode mixture was coated on a Cu foil as a negative electrode current collector, held in a 0.3 T magnetic field for 3 minutes, and then dried at 80° C. to form a negative electrode layer on the negative electrode current collector, a cell for evaluation was prepared in the same manner as in Comparative Example 1.

Comparative Example 8

In the above Preparation of Negative Electrode, SBR (hardness 244 MPa) was used as a binder using scaly graphite (aspect ratio 2.0) as the negative electrode active material, and the prepared negative electrode mixture was coated on a Cu foil as a negative electrode current collector, held in a 0.3 T magnetic field for 3 minutes, and then dried at 80° C., except that a negative electrode layer was formed on the negative electrode current collector, a cell for evaluation was prepared in the same manner as in Comparative Example 1.

Comparative Example 9

In the above Preparation of Negative Electrode, a cell for evaluation was prepared in the same manner as in Comparative Example 1, except that scaly graphite (aspect ratio: 2.0) was used as the negative electrode active material, and a mixture (hardness 811 MPa) containing SBR (hardness 115 MPa) and acrylate (hardness 1886 MPa) in a weight ratio of SBR:acrylate=2:1 was used as a binder, and the prepared negative electrode mixture was coated on a Cu foil as a negative electrode current collector, held in a 0.3 T magnetic field for 3 minutes, and then dried at 80° C. to form a negative electrode layer on the negative electrode current collector.

Example 1

In the above Preparation of Negative Electrode, a cell for evaluation was prepared in the same manner as in Comparative Example 1, except that scaly graphite (aspect ratio 2.0) was used as the negative electrode active material, and a mixture (hardness 1027 MPa) containing SBR (hardness 115 MPa) and acrylate (hardness 1886 MPa) in a weight ratio of SBR:acrylate=1:1 was used as a binder, and the prepared negative electrode mixture was coated on a Cu foil as a negative electrode current collector, held in a 0.3 T magnetic field for 3 minutes, and then dried at 80° C. to form a negative electrode layer on the negative electrode current collector.

Example 2

In the above Preparation of Negative Electrode, a cell for evaluation was prepared in the same manner as in Comparative Example 1, except that scaly graphite (aspect ratio 2.0) was used as the negative electrode active material, and a mixture (hardness 1288 MPa) containing SBR (hardness 115 MPa) and acrylate (hardness 1886 MPa) in a weight ratio of SBR:acrylate=1:2 was used as a binder, and the prepared negative electrode mixture was coated on a Cu foil as a negative electrode current collector, held in a 0.3 T magnetic field for 3 minutes, and then dried at 80° C. to form a negative electrode layer on the negative electrode current collector.

Example 3

In the above Preparation of Negative Electrode, scaly graphite (aspect ratio: 2.0) was used as the negative electrode active material, acrylate (hardness 1886 MPa) was used as the binder, and the prepared negative electrode mixture was coated on a Cu foil as a negative electrode current collector, held in a 0.3 T magnetic field for 3 minutes, and then dried at 80° C. to form a negative electrode layer on the negative electrode current collector.

Orientation Degree I (110)/I (004) Measurement

XRD of the negative electrodes prepared in Comparative Examples 1 to 9 and Examples 1 to 3 were measured under the following conditions.

Conditions: Bulb Cu, Tube Voltage 45 kV, Tube Current 200 mA, Measuring Angle 5 deg to 90 deg, Steps 0.02 deg, Velocity 10 deg/min A value obtained by dividing the 110 diffraction intensity I (110) of the obtained XRD data by the 004 diffraction intensity I (004) was calculated as an orientation degree I (110)/I (004). The results are shown in Table 1. The higher the degree of orientation, the more the graphite stands in the vertical direction.

Battery Resistance Measurement

Figure 2:
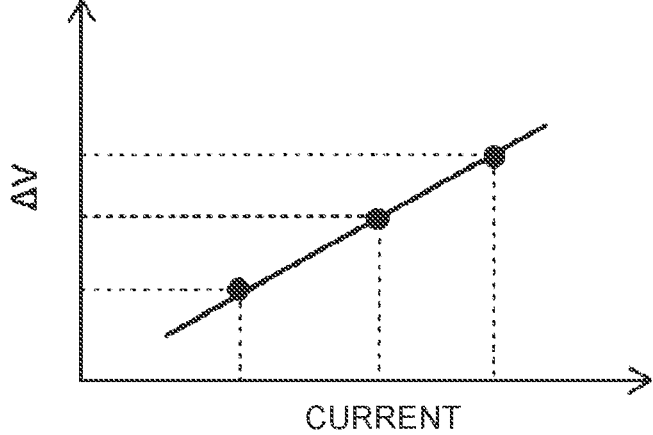
FIG. 2 is a diagram illustrating an example of a relationship between a current and a voltage difference ΔV.

The cells prepared in Comparative Examples 1-9 and Examples 1-3 were initially charged. Thereafter, aging was performed at 60° C. Using this cell, charged for 10 seconds at any current value difference 3 points in SOC 50% in −10° C. environment, the slope of the relation between the voltage difference ΔV and the current value before and after the energization at that time was calculated as a resistance value. FIG. 2 is a diagram illustrating an example of a relationship between a current and a voltage difference ΔV. In the above Preparation of Negative Electrode, using scaly graphite (aspect ratio 2.0) as the negative electrode active material, using SBR (hardness 115 MPa) as a soft binder, the resistance of the cell according to Comparative Example 7 using the negative electrode prepared by applying a magnetic field as a reference (1.0), the resistance of the cells according to Examples, Comparative Example was calculated as the relative resistance ratio. Resistivity±0.01 is considered equivalent performance. The results are shown in Table 1.

negative electrode active material, the degree of orientation of the negative electrode active material is low even when a magnetic field is applied, and it can be seen that the resistance of the cell increases. As shown in Comparative Example 6, using scaly graphite (aspect ratio 2.0) as the negative electrode active material, using a hard binder, without applying a magnetic field, the orientation degree of the negative electrode active material is low, it can be seen that the resistance of the cell increases. As shown in Comparative Examples 5 and 7, even when scaly graphite (aspect ratio 2.0) is used as the negative electrode active material, when the magnetic field is not applied using a soft binder, it can be seen that the resistance of the cell increases. As shown in Comparative Examples 7 to 9 and Example 1, even if the degree of orientation of the negative electrode active material increases in the range of the elastic modulus of the binder from 115 to 811, the resistance of the cell did not change, but from Example 1 and Comparative Example 9, it can be seen that when the elastic modulus of the binder exceeds 811, the degree of orientation of the negative electrode active material increases, thereby reducing the resistance of the cell. This is considered to be because the orientation of the negative electrode active material is maintained even if a press pressure is applied to the negative electrode by using a hard binder having a high elastic modulus.

TABLE 1

| Examples | Negative electrode active material | Binder species | Hardness [Mpa] | Amount of binder added [wt %] | Magnetic field | Press (linear pressure) [kH/m] | Altitude distribution $I_{110}/I_{004}$ | Resistance ratio |
|---|---|---|---|---|---|---|---|---|
| Comparative Example 1 | Spheronized graphite | SBR | 115 | 0.7 | None | 4 | 0.13 | 1.10 |
| Comparative Example 2 | Spheronized graphite | SBR | 115 | 0.7 | Found | 4 | 0.14 | 1.09 |
| Comparative Example 3 | Spheronized graphite | Acryl ester | 1886 | 0.7 | None | 4 | 0.12 | 1.12 |
| Comparative Example 4 | Spheronized graphite | Acryl ester | 1886 | 0.7 | Found | 4 | 0.14 | 1.10 |
| Comparative Example 5 | Scaly graphite | SBR | 115 | 0.7 | None | 4 | 0.09 | 1.11 |
| Comparative Example 6 | Scaly graphite | Acryl ester | 1886 | 0.7 | None | 4 | 0.09 | 1.09 |
| Comparative Example 7 | Scaly graphite | SBR | 115 | 0.7 | Found | 4 | 0.21 | 1.00 |
| Comparative Example 8 | Scaly graphite | SBR | 244 | 0.7 | Found | 4 | 0.23 | 1.00 |
| Comparative Example 9 | Scaly graphite | SBR + acrylate | 811 | 0.7 | Found | 4 | 0.21 | 1.01 |
| Example 1 | Scaly graphite | SBR + acrylate | 1027 | 0.7 | Found | 4 | 0.29 | 0.96 |
| Example 2 | Scaly graphite | SBR + acrylate | 1288 | 0.7 | Found | 4 | 0.33 | 0.95 |
| Example 3 | Scaly graphite | Acryl ester | 1886 | 0.7 | Found | 4 | 0.38 | 0.89 |

Evaluation Results

As shown in Examples 1 to 3 in Table 1, it was demonstrated that a cell using scaly graphite (aspect ratio: 2.0) as a negative electrode active material, a hard binder, and a negative electrode prepared by applying a magnetic field can reduce resistance. From the results of the resistance reduction of Examples 1 to 3, it is predicted that if the degree of orientation of the negative electrode active material is greater than 0.23, the resistance reduction effect of the cell can be obtained, and if the degree of orientation of the negative electrode active material is greater than or equal to 0.25, it is predicted that the resistance of the cell can be further reduced. As shown in Comparative Examples 1 to 4, when spheroidized graphite (aspect ratio: 1.2) is used as the

What is claimed is:

1. A negative electrode for a lithium-ion secondary battery, the negative electrode comprising a negative electrode current collector, and a negative electrode layer, wherein:

the negative electrode layer includes a negative electrode active material and a binder, the negative electrode active material is at least one of mesocarbon microbeads or highly oriented pyrolytic graphite, and the binder is at least one of an acrylic acid-based binder or styrene butadiene rubber;

the binder of the negative electrode layer has an elastic modulus greater than 811 MPa; and when an X-ray diffraction intensity of a (110) plane of the
negative electrode active material is I (110) and the
X-ray diffraction intensity of a (004) plane is I (004), an
orientation degree I (110)/I (004) of the negative elec-
trode active material obtained by dividing I (110) by I
(004) is greater than 0.23.

2. The negative electrode according to claim 1, wherein an
aspect ratio of the negative electrode active material is
greater than 1.2.

3. The negative electrode according to claim 1, wherein
the elastic modulus of the binder is 3000 MPa or less.

4. The negative electrode according to claim 1, wherein
the elastic modulus of the binder is 1886 MPa or less.

5. The negative electrode according to claim 1, wherein
the elastic modulus of the binder is 1027 MPa or more.

6. The negative electrode according to claim 1, wherein
the orientation degree I (110)/I (004) is 0.25 or more.

* * * * *